United States Patent
Irikura

[19]

[11] Patent Number: 6,000,092
[45] Date of Patent: *Dec. 14, 1999

[54] WIPER DEVICE WITH ELASTIC TORSION LOAD ABSORBER

[75] Inventor: Shuichi Irikura, Aichi-ken, Japan

[73] Assignee: Asmo Co., Ltd., Shizuoka-ken, Japan

[ * ] Notice: This patent is subject to a terminal disclaimer.

[21] Appl. No.: 09/100,343

[22] Filed: Jun. 19, 1998

Related U.S. Application Data

[62] Division of application No. 08/569,061, Dec. 8, 1995, Pat. No. 5,894,627.

[30] Foreign Application Priority Data

Dec. 27, 1994 [JP] Japan .................................. 6-339680

[51] Int. Cl.$^6$ .................................. B60S 1/18; B60S 1/06
[52] U.S. Cl. .................................. 15/250.13; 15/250.31; 74/42; 74/75; 74/470
[58] Field of Search .................................. 15/250.13, 250.16, 15/250.3, 250.31, 250.21; 74/70, 75, 600, 599, 42, 470, 524

[56] References Cited

U.S. PATENT DOCUMENTS

| | | | |
|---|---|---|---|
| 1,761,526 | 6/1930 | Geyer | 74/599 |
| 4,736,487 | 4/1988 | Epple et al. | 15/250.31 |
| 4,765,018 | 8/1988 | Buchanan, Jr. | 15/250.13 |
| 5,179,759 | 1/1993 | Epple et al. | 15/250.13 |
| 5,179,760 | 1/1993 | Abe | 15/250.13 |
| 5,735,015 | 4/1998 | Yoshida et al. | 15/250.31 |

FOREIGN PATENT DOCUMENTS

| | | | |
|---|---|---|---|
| 2557051 | 6/1985 | France . | |
| 2820104 | 11/1979 | Germany . | |
| 3734392 | 4/1989 | Germany . | |
| 4323551 | 1/1994 | Germany | 15/250.3 |
| 233141 | 9/1989 | Japan | 15/250.13 |
| 5-566694 | 7/1993 | Japan . | |

Primary Examiner—Gary K. Graham
Attorney, Agent, or Firm—Hazel & Thomas, P.C.

[57] ABSTRACT

A wiper device for a vehicle which, when abnormal load is applied, absorbs the abnormal load so that wiping operation by a wiper blade can be carried out continuously. The wiper device is compact, and dimensional management thereof is easy. One end of a first crank lever forming a portion of a crank arm is attached to an output shaft, whereas a cylindrical portion is fixed by caulking to another end of the first crank lever by a pin. An annular portion is formed at one end of a second crank lever. An elastic rubber bush is interposed between the cylindrical portion and the annular portion. The first crank lever and the second crank lever are supported by the elastic rubber bush so as to be freely rotatable.

13 Claims, 11 Drawing Sheets

WIPER DEVICE WITH ELASTIC TORSION LOAD ABSORBER

This application is a Division of nonprovisional application Ser. No. 08/569,061 filed Dec. 8. 1995 now U.S. Pat. No. 5,894,627.

BACKGROUND OF THE INVENTION

1. Field of the Invention

The present invention relates to a wiper device for a vehicle which absorbs an abnormal load applied thereto.

2. Description of the Prior Art

Conventionally, in wiper devices for vehicles, there is a drawback in that when the wiper device is operated with, for example, snow having accumulated on the wiper wiping range, the wiper blades collide against the accumulated snow such that the wiping operation is hampered. Therefore, abnormal load is generated at the wiper blades, and the operation of the entire wiper device stops.

In order to overcome this drawback, Japanese Utility Model No. 5-56694 discloses a wiper device for a vehicle which absorbs abnormal load such that continuous operation is possible.

As illustrated in FIGS. 10 and 11, in this wiper device, a first link rod 113 and a first pivot lever 114 are connected via a segment lever 115. The segment lever 115 is formed by a first connecting portion 121, which is supported so as to rotate freely with the first pivot lever 114, and a second connecting portion 122, which is set apart from the first connecting portion 121. The second connecting portion 122 is fixed by a second connecting pin 114c at whose outer periphery a buffer member 110 is disposed. In accordance with this wiper device, when abnormal load is applied, the segment lever 115 rotates around the first connecting portion 121 a predetermined angle with respect to the first pivot lever 114. The buffer member 110 compressively deforms in the radial direction in accordance with the rotation of the segment lever 115, so that the abnormal load can be absorbed.

However, in this disclosed art, the first pivot lever 114 and the segment lever 115 are attached at the first connecting portion 121 so as to be freely rotatable. A drawback arises in that, because there is joggling between the first connecting portion 121 and the segment lever 115, the dimensions of the first connecting portion 121 and the segment lever 115 must be strictly managed during manufacturing.

The rotational angle of the segment lever 115 is determined by the outer diameter dimension of the buffer member 110. Therefore, a drawback arises in that, in order to handle abnormal loads of wiper devices having large wiping angles, the outer diameter of the buffer member 110 must be made large, which leads to an increase in the size of the wiper device.

Other art related to the present invention are disclosed in U.S. Pat. No. 4,765,018; DE 3734309A1; DE 2820104A1; and FR 2557051.

SUMMARY OF THE INVENTION

In view of the aforementioned, an object of the present invention is to provide a wiper device for a vehicle which absorbs abnormal load so that wiping operation can be carried out continuously, and which is compact, and in which dimensional management is easy.

An aspect of the present invention is a wiper device for a vehicle comprising: a crank arm connected to an output shaft of a motor; a link rod connected to the crank arm so as to be freely rotatable; a pivot lever connected to the link rod so as to be freely rotatable; and a wiper arm connected to the pivot lever via a pivot shaft, wherein the crank arm is formed by a first lever which is connected to the output shaft, a second lever which is connected to the link rod so as to be freely rotatable, and an elastic bush which torsionally deforms elastically in accordance with relative rotation between the first lever and the second lever.

In accordance with the present invention, during normal wiper operation, the first lever and the second lever are interlocked with the motor and do not rotate relatively. On the other hand, when abnormal load is generated (e.g., when the wiping range is narrowed due to accumulated snow), the abnormal load is transmitted to the crank arm via the wiper arm and the pivot shaft. As a result, the abnormal load is applied to the crank arm. At this time, the elastic bush torsionally deforms elastically in accordance with the relative rotation between the first lever and the second lever, and absorbs the abnormal load. Further, because the first lever and the second lever rotate relatively, even if the wiper arm is forcibly stopped, the motor can be operated continuously.

The first lever and the second lever are connected via the elastic bush which torsionally deforms elastically. Therefore, there is no joggling between the first lever and the second lever. As a result, management of the dimensions of the first lever and the second lever and management of the dimension between the first lever and the second lever are facilitated.

During normal operation of the wiper, the elastic bush absorbs the vibration transmitted from the wiper arm. Therefore, the vibration of the first lever can be made extremely small.

Further, the range over which the first lever and the second lever can rotate relatively can be varied merely by varying the torsional rigidity (torsional characteristic) of the elastic bush. Therefore, there is no need to make the outer radius of the elastic bush large with respect to the abnormal load of a wiper device for a vehicle having a large wiping angle.

DETAILED DESCRIPTION OF THE PREFERRED EMBODIMENTS

Embodiments actualizing the wiper device for a vehicle of the present invention will be described hereinafter on the basis of FIGS. 1 through 9.

First Embodiment

Figure 1:
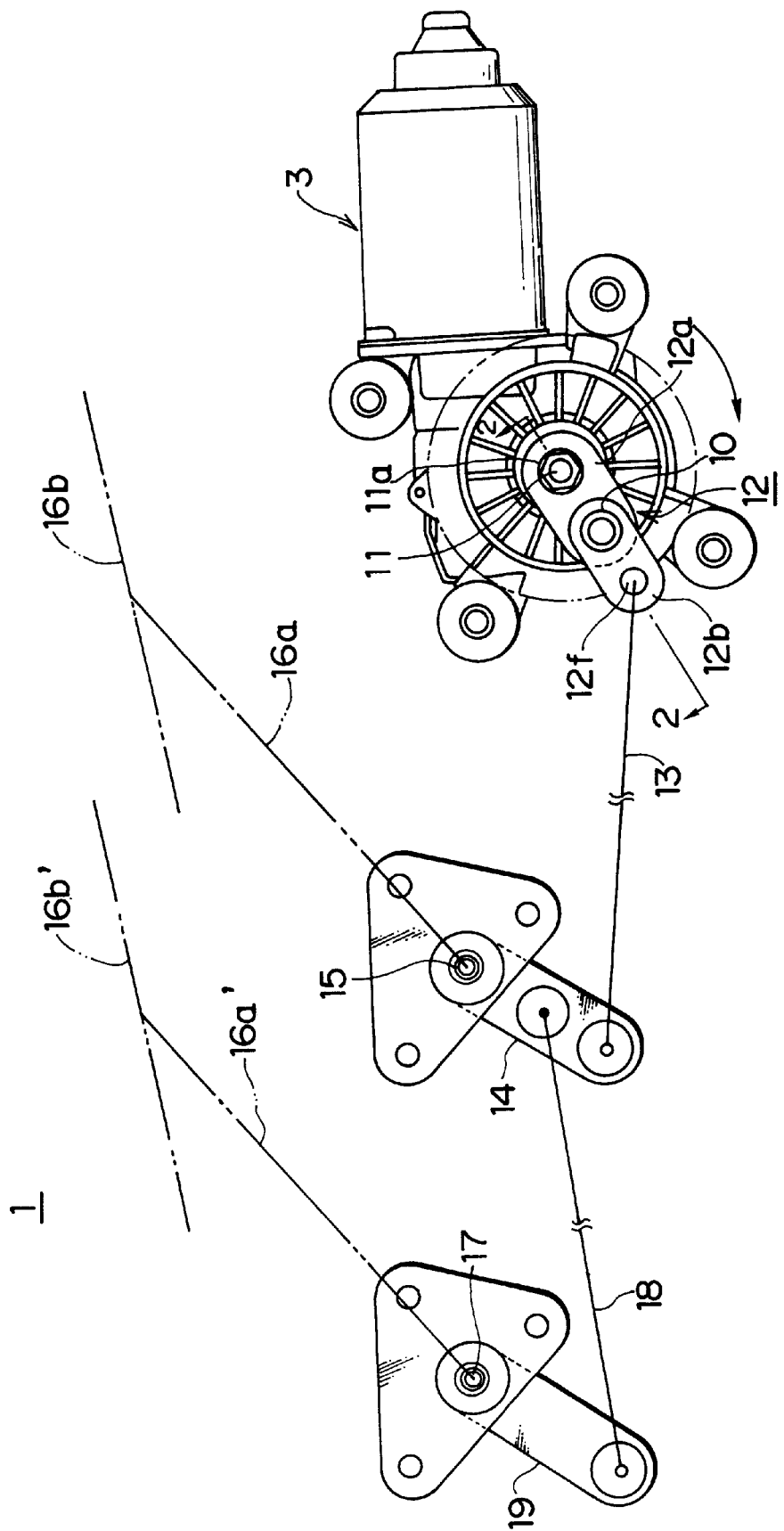
FIG. 1 is a view illustrating the basic structure of a first embodiment and a second embodiment of a wiper device for a vehicle relating to the present invention.

As illustrated in FIG. 1, at a wiper device 1 for a vehicle, one end of a crank arm 12 is attached to an output shaft 11 of a wiper motor 3. A ball pin 12f is attached to the other end of the crank arm 12. One end of a link rod 13 is connected to the ball pin 12f so as to be freely rotatable. The other end of the link rod 13 is connected to one end of a pivot lever 14 so as to be freely rotatable. A pivot shaft 15, to which one end of a wiper arm 16a is attached, is fixed to the other end of the first pivot lever 14. One end of a link rod 18 is connected to the substantial center of the pivot lever 14 so as to be freely rotatable. One end of a second pivot lever 19 is connected to the other end of the link rod 18 so as to be freely rotatable. A pivot shaft 17, to which one end of a wiper arm 16a' is attached, is fixed to the other end of the pivot lever 19. The respective other ends of the wiper arms 16a, 16a' are rotatably fixed to substantially central portions of wiper blades 16b, 16b'.

Figure 2:
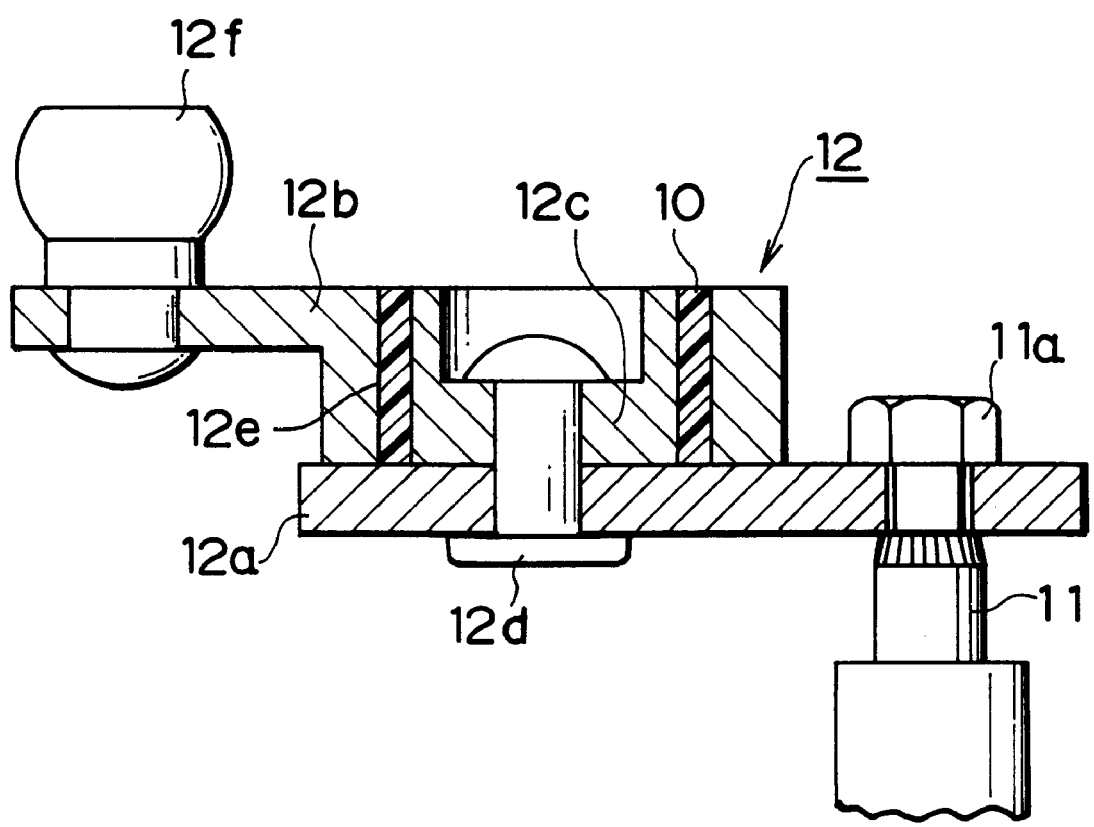
FIG. 2 is a cross-sectional view taken along line 2—2 of FIG. 1 and Illustrating a crank arm.

As illustrated in FIG. 2, the crank arm 12 which is attached to an output shaft 11 is basically formed by a first crank lever 12a which is metal and serves as a first lever, a second crank lever 12b which is metal and serves as a second lever, and an elastic rubber bush 10 which serves as an elastic bush and will be described in detail later.

One end of the first crank lever 12a is fixed to the output shaft 11 via a nut 11a. The other end of the first crank lever 12a is strongly fixed by caulking to a metal cylindrical portion 12c by a pin 12d.

An annular portion 12e, whose inner diameter is greater than the outer diameter of the cylindrical portion 12c, is formed at one end of the second crank lever 12b. The ball pin 12f is fixed to the other end of the second crank lever 12b. One end of the link rod 13 is connected to the ball pin 12f so as to be freely rotatable.

The elastic rubber bush 10 is disposed between the outer peripheral surface of the cylindrical portion 12c and the inner peripheral surface of the annular portion 12e. The elastic rubber bush 10 is adhered and fixed, by vulcanization or the like, to the outer peripheral surface of the cylindrical portion 12c and to the inner peripheral surface of the annular portion 12e. The elastic rubber bush 10 supports the first crank lever 12a and the second crank lever 12b such that the first crank lever 12a and the second crank lever 12b are freely rotatable, and connects the first crank lever 12a and the second crank lever 12b. The elastic rubber bush 10 of the present embodiment has high torsional rigidity (torsional characteristic). As a result, the elastic rubber bush 10 has restoring force for returning to its original state from its twisted state. Examples of the material which may be used for the elastic rubber bush 10 include styrene butadiene rubber (SBR), natural rubber (NR), chloroprene rubber (CR), compounds of these rubbers, thermoplastic urethane elastomers, and the like.

In operation, the rotational power of the wiper motor 3 is transmitted to the pivot shaft 15 via the crank arm 12, the link rod 13 and the pivot lever 14, so that the wiper arm 16a and the wiper blade 16b are rotated reciprocally. Further, the rotational power of the wiper motor 3 is transmitted to the pivot shaft 17 via the pivot lever 14, the link rod 18 and the pivot lever 19, so that the wiper arm 16a' and the wiper blade 16b' are rotated reciprocally.

Figure 3:
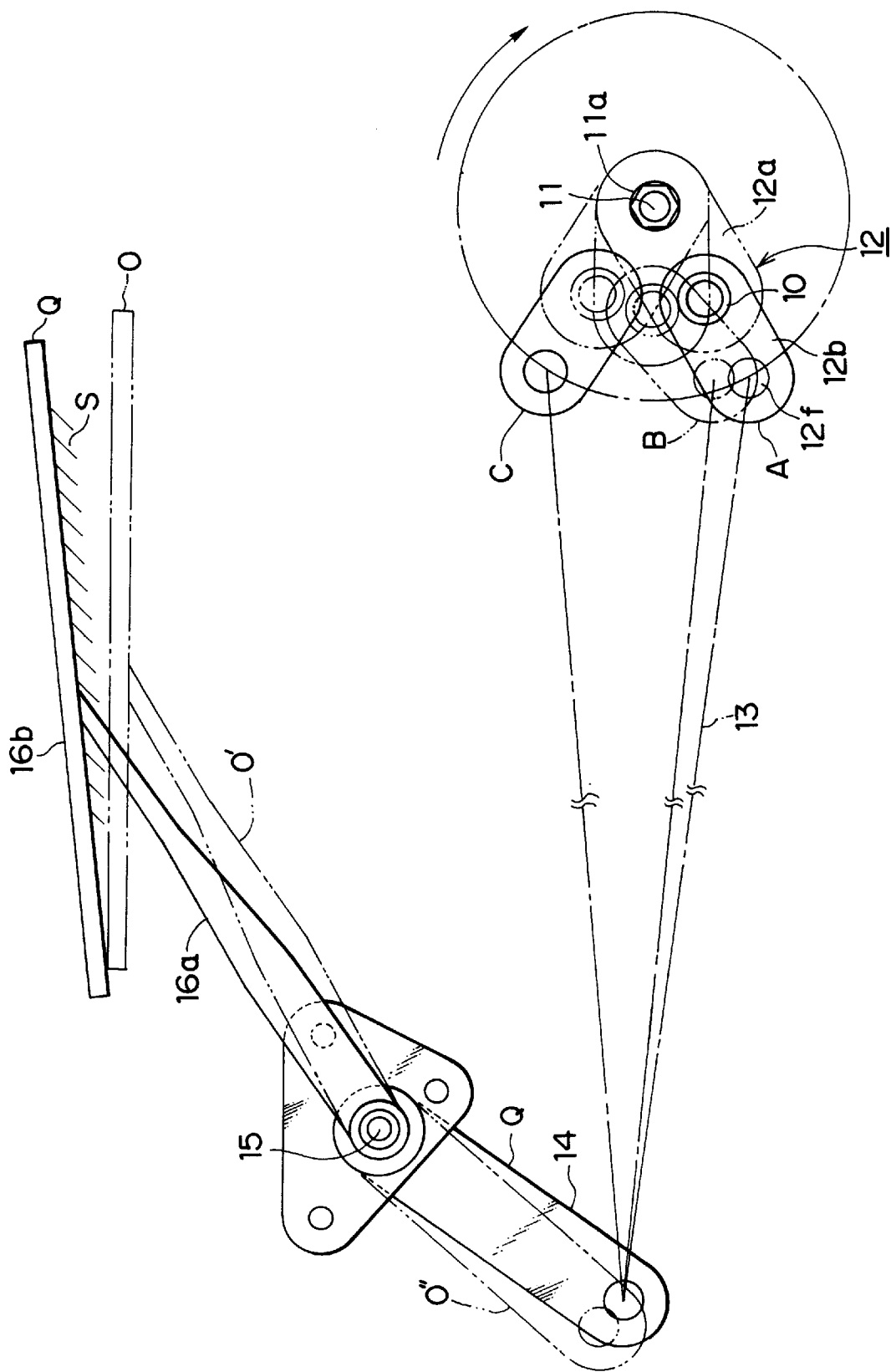
FIG. 3 is a view for explaining operation of the wiper device for a vehicle of the first embodiment.

Accordingly, as illustrated in FIG. 3, at normal times (times when no abnormal load is applied due to accumulated snow or the like), when the wiper device 1 for a vehicle is operated, the wiper blade 16b rotates to the lower reversal position O illustrated by the two-dot chain line. The wiper arm 16 and the first pivot lever 14 at this time are at positions O' and O", respectively, which are illustrated by the two-dot chain lines. In order to simplify explanation, the second pivot lever 19 side, at which the wiper arm 16a', the wiper blade 16b' and the like are shown, is omitted from FIG. 3.

When the wiper device 1 for an automobile is operated on an unillustrated windshield glass surface when, for example, snow has accumulated thereon, load is applied when the wiper blade 16b attempts to wipe the accumulated snow (the hatched portion S in FIG. 3). When this load is greater than the rotational force of the wiper blade 16b, in a state in which the wiper blade 16b abuts the accumulated snow S, abnormal load is applied to the wiper blade 16b and the wiping range of the wiper blade 16b is narrowed. Specifically, due to the accumulated snow S, the rotation of the wiper blade 16b to the normal lower reversal position O is impeded, and the wiper blade 16b is forcibly stopped at the limited lower reversal position Q.

When the wiper blade 16b is forcibly stopped at the limited lower reversal position Q, because the elastic rubber bush 10, which shaft-supports the first crank lever 12a and the second crank lever 12b such that they are relatively rotatable, is provided at the crank arm 12, the elastic rubber bush 10 torsionally deforms elastically, and the second crank lever 12b rotates with respect to the first crank lever 12a (state B in FIG. 3). Because the second crank lever 12b rotates with respect to the first crank lever 12a, the rotational operation of the wiper motor 3 is continuous. Specifically, the first crank lever 12a and the second crank lever 12b change successively from state A to state B, and from state B to state C. Therefore, the rotational operation of the wiper motor 3 is continuous until the locking of the wiper blade 16b which is at the limited lower reversal position Q is canceled.

In accordance with the wiper device for a vehicle of the first embodiment, the elastic rubber bush 10, which shaft-supports the first crank lever 12a and the second crank lever 12b such that they are relatively rotatable, is provided at the crank arm 12. The elastic rubber bush 10 torsionally deforms elastically, and the second crank lever 12b rotates with respect to the first crank lever 12a. Therefore, the rotational operation of the wiper motor 3 can be carried out continuously. Accordingly, there are no drawbacks such as those of the prior art in which the wiper blade 16b is forcibly locked due to the abnormal load and the operation of the entire wiper device 1 for a vehicle stops.

Further, the rotating portions of the first crank lever 12a and the second crank lever 12b are connected by the elastic rubber bush 10. Therefore, there is no joggling between the first crank lever 12a and the second crank lever 12b, and management of the dimensions of the wiper device for a vehicle during manufacturing is facilitated. Accordingly, there is no need to strictly manage the dimensions during manufacturing in order to prevent joggling, as there is in the conventional art. As a result, manufacturing costs can be reduced.

Further, vibrations, which are generated by the wiper blade 16b during normal wiper wiping operation and which are transmitted to the first crank lever 12a via the first pivot lever 14, the link rod 13 and the second crank lever 12b, are absorbed by the elastic rubber bush 10. Therefore, vibration of the wiper device 1 can be reduced.

Moreover, the range over which the first crank lever 12a and the second crank lever 12b are relatively rotatable can be changed merely by changing the torsional characteristic of the elastic rubber bush 10. Therefore, there is no need to make the outer diameter of the elastic rubber bush 10 large with respect to the abnormal load of the wiper blade 16b having a large wiping angle. Accordingly, the wiper device 1 for a vehicle can be made compact as compared with a conventional wiping device for a vehicle.

Figure 4:
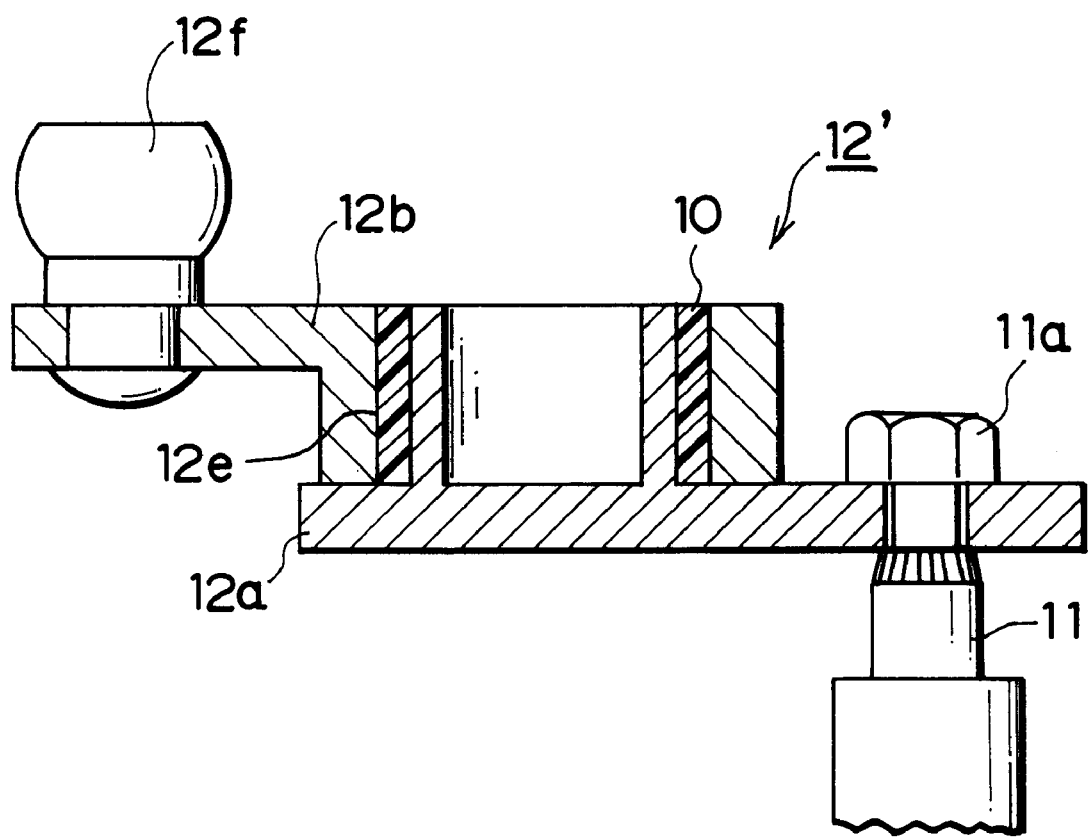
FIG. 4 is a cross-sectional view corresponding to FIG. 2 and illustrating a variant example of the crank arm.

In the present embodiment, the other end of the first crank lever 12a is strongly fixed by caulking to the metal cylindrical portion 12c by the pin 12d. However, the fixing of the other end of the first crank lever 12a to the cylindrical portion 12c is not limited to caulking. For example, as illustrated in FIG. 4, the first crank lever 12a and the cylindrical portion 12c are formed integrally by sintered metal or the like. In this way, the number of parts can be reduced, and there is no need to carry out fixing by caulking. Therefore, the manufacturing costs of the wiper device for a vehicle can be reduced.

Figure 5:
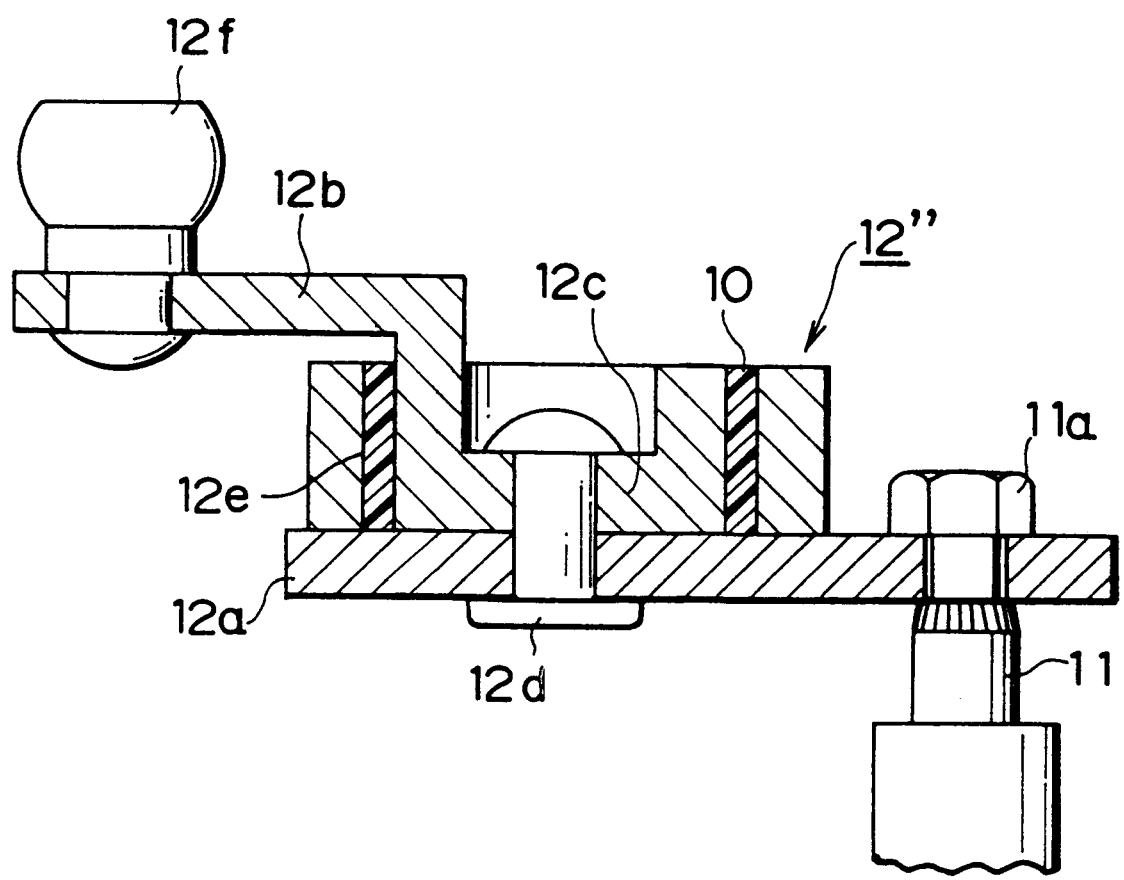
FIG. 5 is a cross-sectional view corresponding to FIG. 2 and illustrating another variant example of the crank arm.

Further, as illustrated in FIG. 5, at the first crank lever 12a and the second crank lever 12b, the positional relationship between the cylindrical portion 12c and the annular portion 12e (the relationship between the inner periphery and the outer periphery) can be reversed. In this case, the cylindrical portion 12c and the annular portion 12e are connected by a rivet 12d so as to be freely rotatable.

Second Embodiment

Figure 6:
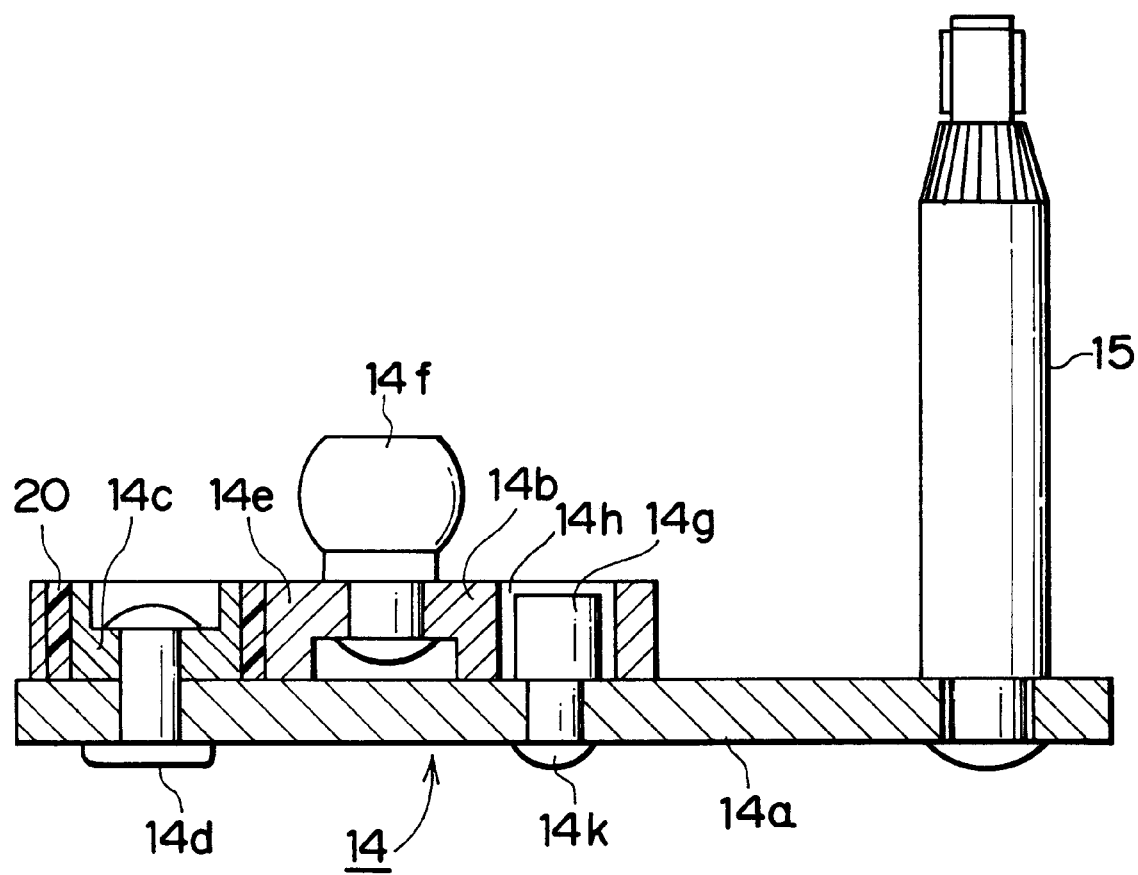
FIG. 6 is a cross-sectional view taken along line 6—6 of FIG. 7 and illustrating a pivot lever of the wiper device for a vehicle of the second embodiment of the present invention.
Figure 7:
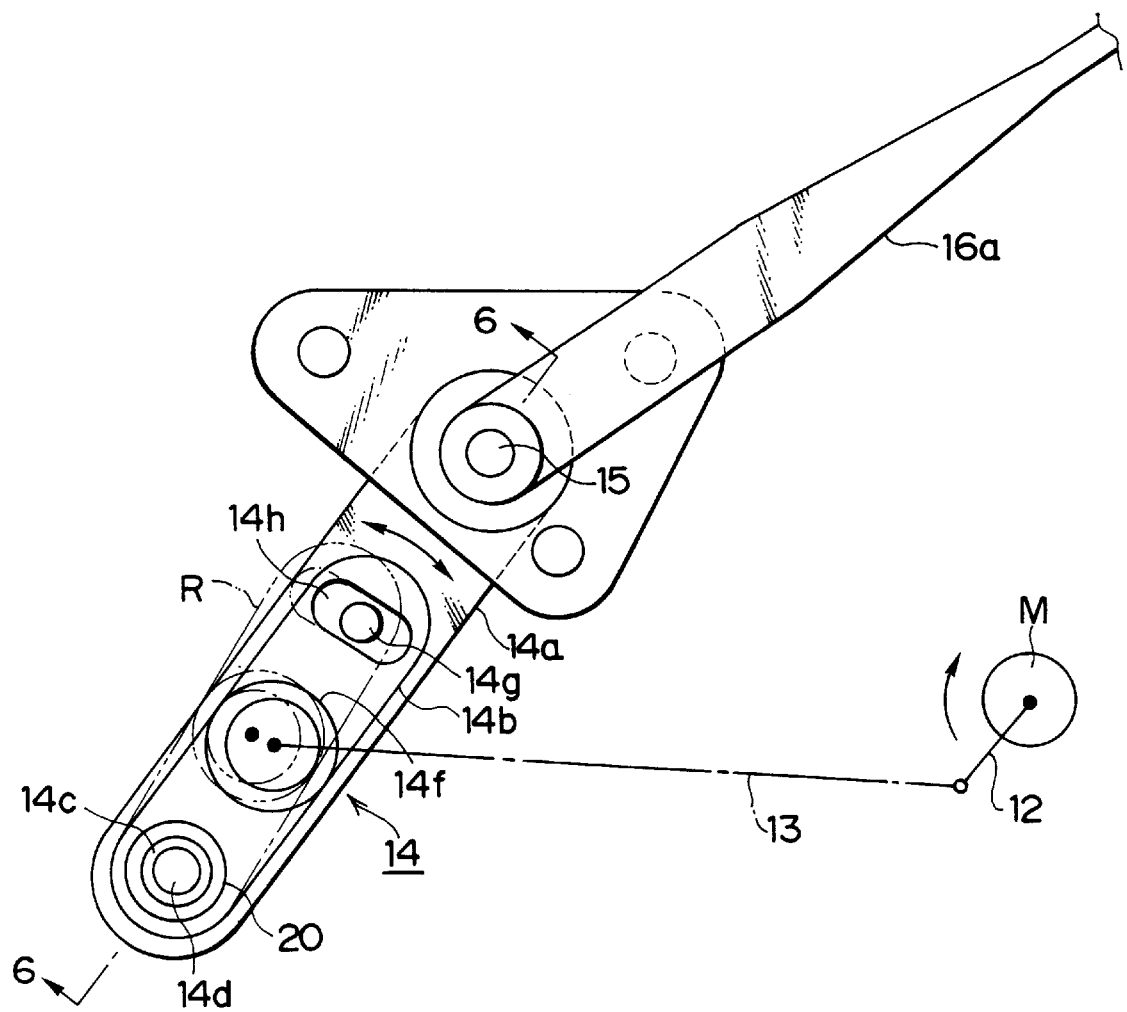
FIG. 7 is a view for explaining operation of the wiper device for a vehicle of the second embodiment.

As illustrated in FIGS. 6 and 7, the pivot lever 14 of the second embodiment basically comprises a first pivot lever 14a which is metal and serves as a first lever, a second pivot lever 14b which is metal and serves as a second lever, and an elastic rubber bush 20 which will be described in detail later. In the present embodiment, members which are the same as those of the first embodiment are denoted by the same reference numerals, and description thereof is omitted.

As shown in FIG. 6, one end of the first pivot lever 14a is attached to the pivot shaft 15. The other end of the first pivot lever 14a is strongly fixed by caulking to the metal cylindrical portion 14c by the pin 14d.

The annular portion 14e, which has an inner diameter which is greater than the outer diameter of the cylindrical portion 14c, is formed at one end of the second pivot lever 14b. The ball pin 14f is fixed to the substantial center of the second pivot lever 14b. One end of the link rod 13 is connected to the ball pin 14f so as to be freely rotatable (see FIG. 7).

The elastic rubber bush 20 is disposed between the outer peripheral surface of the cylindrical portion 14c and the inner peripheral surface of the annular portion 14e. The elastic rubber bush 20 is adhered and fixed, by vulcanization or the like, to the outer peripheral surface of the cylindrical portion 14c and to the inner peripheral surface of the annular portion 14e. Specifically, the elastic rubber bush 20 shaft-supports the first pivot lever 14a and the second pivot lever 14b such that they are freely rotatable, and connects the first pivot lever 14a and the second pivot lever 14b. The elastic rubber bush 20 of the present embodiment has high torsional rigidity. As a result, the elastic rubber bush 20 has restoring force for returning to its original state from its twisted state. The same materials as those used for the elastic rubber bush 10 described in the first embodiment can be used for the elastic rubber bush 20 as well.

A cylindrical projecting portion 14g is strongly fixed by caulking to the substantial center of the first pivot lever 14a by a pin 14k. An elongated insertion hole 14h, in which the projecting portion 14g is inserted with degrees of freedom, is provided at the other end of the second pivot lever 14b.

When abnormal load is applied to the wiper blade 16b in operation, the abnormal load is transferred to the wiper arm 16a, the pivot shaft 15 and the first pivot lever 14a (see FIG. 7). The elastic rubber bush 20, which supports the first pivot lever 14a and the second pivot lever 14b such that they are relatively rotatable, is provided at the first pivot lever 14. Therefore, when abnormal load is applied, the elastic rubber bush 20 torsionally deforms elastically, and the second pivot lever 14b rotates with respect to the first pivot lever 14a.

Further, the projecting portion 14g moves relatively with respect to the elongated insertion hole 14h in accordance with the rotation of the second pivot lever 14b with respect to the first pivot lever 14a. The rotation of the second pivot lever 14b with respect to the first pivot lever 14a is regulated at the position at which the projecting portion 14g abuts the longitudinal direction end inner surface of the elongated insertion hole 14h (position R in FIG. 7). Accordingly, the projecting portion 14g and the elongated insertion hole 14h, which serve as a regulating means, regulate the range of relative movement of the first pivot lever 14a and the second pivot lever 14b.

In accordance with the present embodiment, even in a state in which the wiper blade 16b is forcibly stopped, because the second pivot lever 14b rotates with respect to the first pivot lever 14a, the wiper motor 3 is rotatable and the rotational operation can be continued. Specifically, the rotational operation of the wiper motor 3 can be carried out continuously until the locking has been canceled.

Because the rotation portions of the first pivot lever 14a and the second pivot lever 14b are connected only at the elastic rubber bush 20, there is no joggling between the first pivot lever 14a and the second pivot lever 14b, and management of the dimensions of the wiper device 1 for a vehicle during manufacturing is facilitated.

During normal wiper wiping operation, the vibration generated by the wiper blade 16b can be decreased by the elastic rubber bush 20 via the pivot shaft 15.

The range of relative rotation between the first pivot lever 14a and the second pivot lever 14b can be adjusted by changing the torsional characteristic of the elastic rubber bush 20 or by changing the configuration of the elongated through hole 14h. Therefore, there is no need to make the outer diameter of the elastic rubber bush 20 large with respect to the abnormal load of the wiper device 1 for a vehicle having a large wiping angle.

Further, the range of relative rotation of the first pivot lever 14a and the second pivot lever 14b can be regulated by the projecting portion 14g and the elongated insertion hole 14h. Therefore, excessive torsion of the elastic rubber bush 20 can be prevented.

Figure 8:
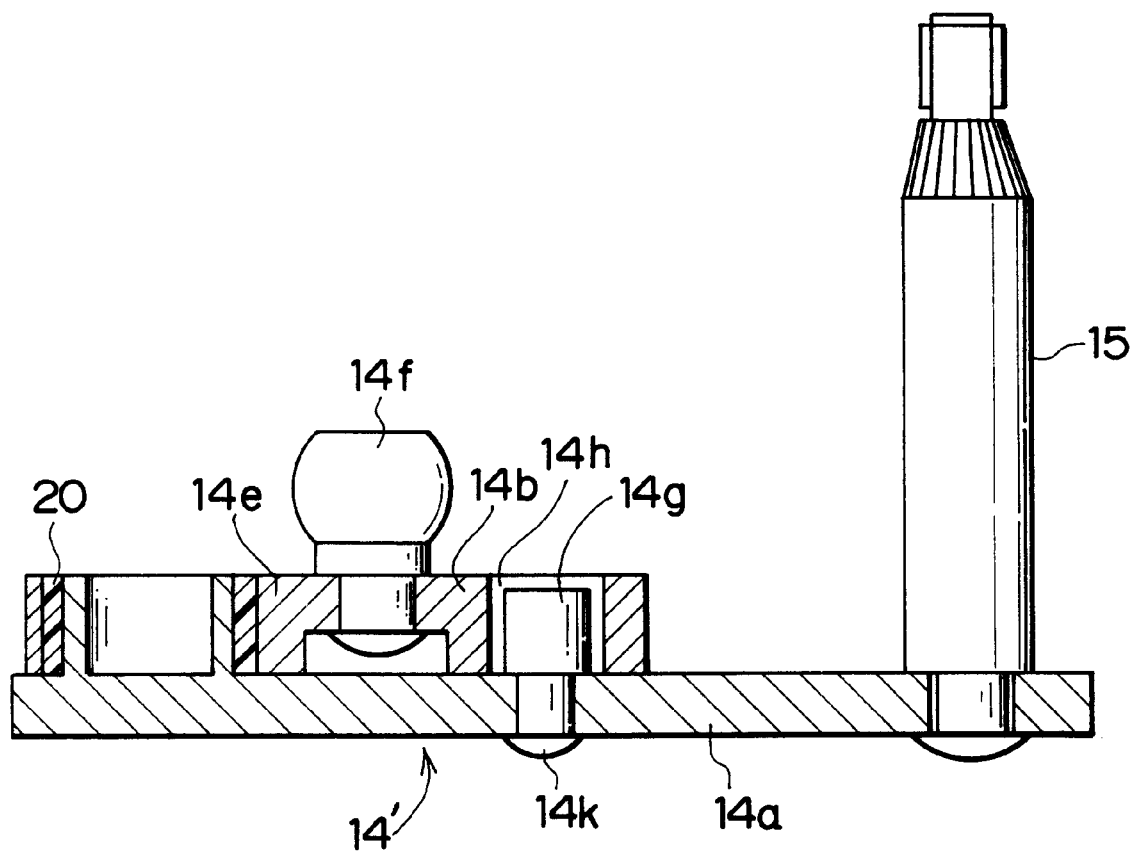
FIG. 8 is a cross-sectional view corresponding to FIG. 6 and illustrating a variant example of the pivot lever.

In the present embodiment, the other end of the first pivot lever 14a is strongly fixed by caulking to the metal, cylindrical portion 14c by the pin 14d. However, as illustrated in FIG. 8, the first pivot lever 14a and the cylindrical portion 14c may be formed integrally by sintered metal or the like. In this way, the number of parts can be reduced, and there is no need for fixing by caulking.

Figure 9:
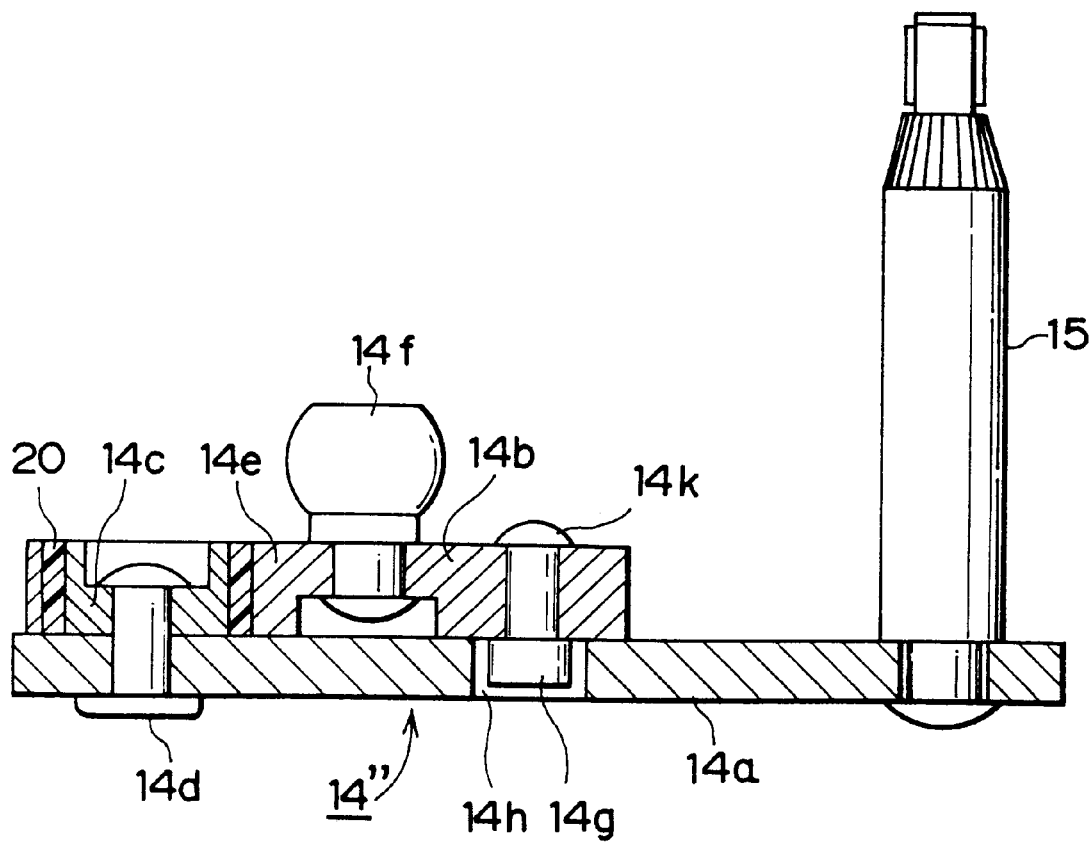
FIG. 9 is a cross-sectional view corresponding to FIG. 6 and illustrating another variant example of the pivot lever.
Figure 10:
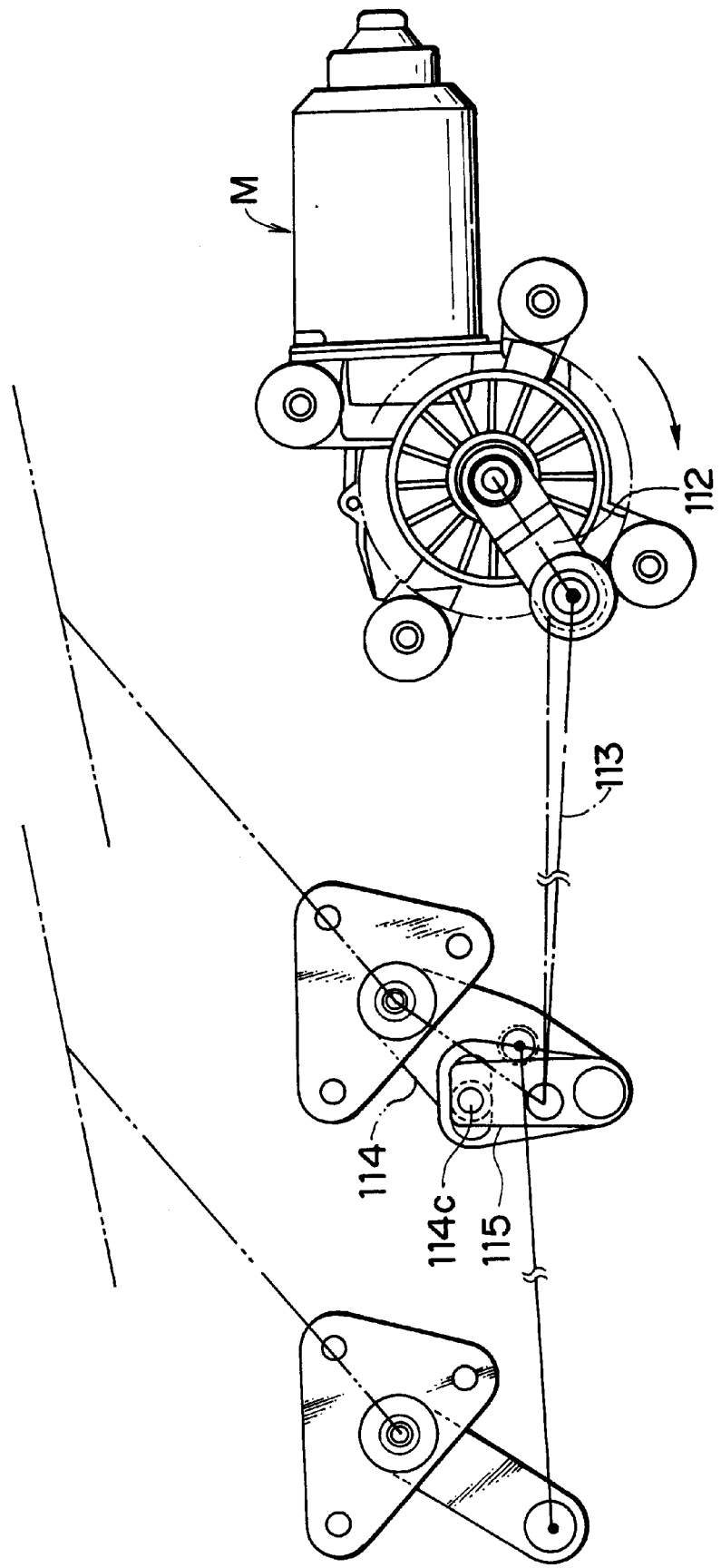
FIG. 10 is an explanatory view illustrating the basic structure of a conventional wiper device for a vehicle.
Figure 11:
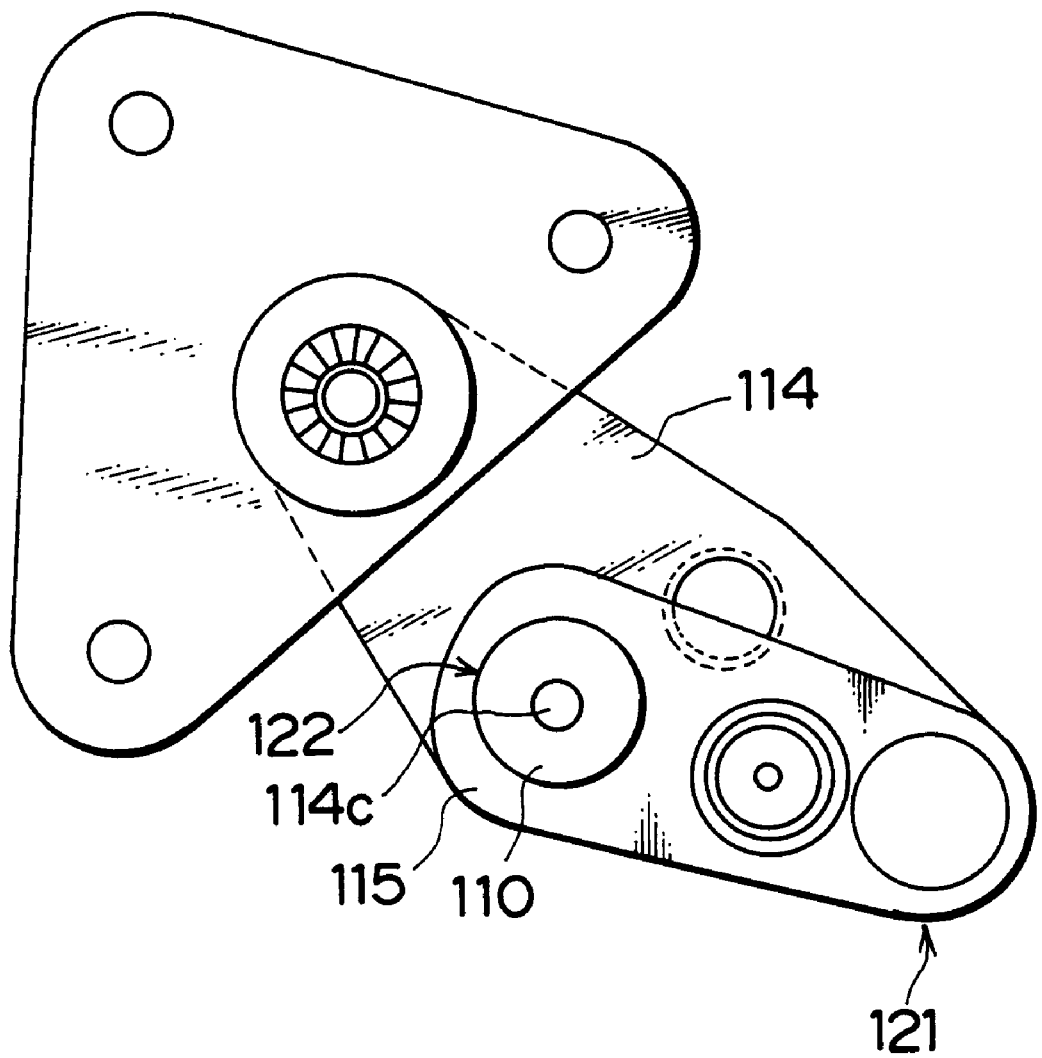
FIG. 11 is a view illustrating in detail a first pivot lever and a first connecting portion of the conventional wiper device for a vehicle.

Further, as illustrated in FIG. 9, the positional relationship of the projecting portion 14g and the elongated through hole 14h, which are the regulating means, can be reversed at the first pivot lever 14a and the second pivot lever 14b.

The second pivot lever 19 may be structured in the same way as the first pivot lever 14 of the present embodiment.

What is claimed is:

1. A wiper device for a vehicle comprising:
   a crank arm connected to an output shaft of a motor;
   a link rod connected to said crank arm so as to be freely rotatable;
   a pivot lever connected to said link rod so as to be freely rotatable; and
   a wiper arm connected to said pivot lever via a pivot shaft, wherein said pivot lever is formed by a first lever which is connected to said pivot shaft, and a second lever which is connected to said link rod so as to be freely rotatable, wherein the first lever and the second lever are connected via an elastic bush which torsionally deforms elastically in accordance with relative rotation between said first lever and said second lever.

2. A wiper device according to claim 1, wherein said elastic bush damps vibration transmitted from said first lever to said second lever.

3. A wiper device according to claim 1, wherein said elastic bush is adhered and fixed to said first lever and said second lever.

4. A wiper device according to claim 3, wherein said elastic bush is adhered and fixed to said first lever and said second lever by vulcanization.

5. A wiper device according to claim 1, wherein said elastic bush shaft-supports said first lever and said second lever such that said first lever and said second lever rotate relatively.

6. A wiper device for a vehicle according to claim 1, wherein
   said pivot shaft is connected to one end of said first lever, and a cylindrical member is fixed to another end of said first lever along an axial direction of said pivot shaft, and
   said elastic bush is cylindrical, and an inner peripheral surface of said elastic bush is adhered and fixed to an outer peripheral surface of the cylindrical member, and
   said second lever has a cylindrical hole at one end of said second lever, and an outer peripheral surface of said elastic bush is adhered and fixed to an inner peripheral surface of the cylindrical hole, and
   said link rod is connected to one of a substantially central portion of said second lever and another end of said second lever so as to be freely rotatable.

7. A wiper device for a vehicle according to claim 1, wherein
   said pivot shaft is connected to one end of said first lever, and a cylindrical portion is formed integrally with another end of said first lever, and
   said elastic bush is cylindrical, and a cylindrical inner peripheral surface of said elastic bush is adhered and fixed to an outer peripheral surface of the cylindrical portion, and
   a cylindrical hole is formed at one end of said second lever, and an outer peripheral surface of said elastic bush is adhered and fixed to an inner peripheral surface of the cylindrical hole, and
   said link rod is connected to one of a substantially central portion of said second lever and another end of said second lever so as to be freely rotatable.

8. A wiper device for a vehicle comprising:
   a crank arm connected to an output shaft of a motor;
   a link rod connected to said crank arm so as to be freely rotatable;
   a pivot lever connected to said link rod so as to be freely rotatable; and
   a wiper arm connected to said pivot lever via a pivot shaft, wherein said pivot lever is formed by a first lever which is connected to said pivot shaft, a second lever which is connected to said link rod so as to be freely rotatable, wherein the first lever and the second lever are connected via an elastic bush which torsionally deforms elastically in accordance with relative rotation between said first lever and said second lever, and regulating means for regulating a range of the relative rotation between said first lever and said second lever.

9. A wiper device for a vehicle according to claim 8. wherein said regulating means regulates a range of torsional deformation of said elastic bush such that said elastic bush torsionally deforms within a predetermined range of elastic deformation.

10. A wiper device for a vehicle according to claim 8. wherein said regulating means is formed by a stopper pin, which is formed at said first lever so as to project therefrom, and by an elongated hole, which is formed in a direction orthogonal to a longitudinal direction of said second lever such that the stopper pin is inserted in and movable within the elongated hole.

11. A wiper device for a vehicle according to claim 10, wherein the range of relative rotation is restricted by the stopper pin abutting an inner surface of the elongated hole.

12. A wiper device according to claim 8, wherein said regulating means is formed by a stopper pin, which is formed said second lever so as to project therefrom, and by an elongated hole, which is formed in a direction orthogonal to a longitudinal direction of said first lever such that the stopper pin is inserted in and movable within the elongated hole.

13. A wiper device for a vehicle comprising:
   a crank arm connected to an output shaft of a motor;
   a link rod connected to said crank arm so as to be freely rotatable;
   a pivot lever connected to said link rod so as to be freely rotatable;
   a wiper arm connected to said pivot lever via a pivot shaft, wherein
   one of said output shaft and said pivot lever defines means for translating abnormal loads from said wiper arm, said means for translating including a first lever and a second lever, one end of said first lever being connected to said one of said output shaft and said pivot shaft, another end of said first lever being connected to said second lever, which is connected to said link rod so as to be freely rotatable; and
   means for regulating relative rotation between said first lever and said second lever via elastic torsion wherein
   said means for regulating pivotably supports said first lever and said second lever such that said first lever and said second lever rotate around said means for regulating.

* * * * *